May 2, 1967 A. PITNER 3,317,014
THRUST BEARINGS

Filed Sept. 1, 1964 2 Sheets-Sheet 1

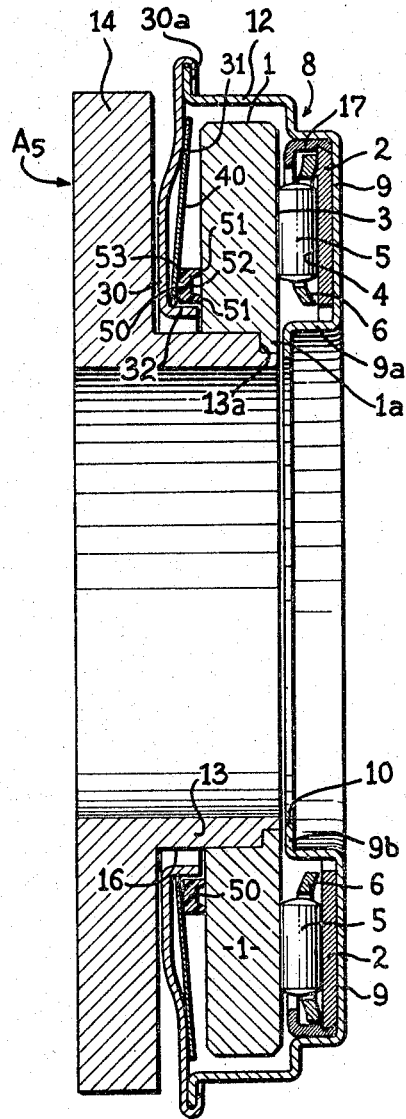

United States Patent Office 3,317,014
Patented May 2, 1967

3,317,014
THRUST BEARINGS
Alfred Pitner, Paris, France, assignor to Nadella S.A., Rueil-Malmaison, France, a French body corporate
Filed Sept. 1, 1964, Ser. No. 393,595
Claims priority, application France, Sept. 10, 1963, 947,018; Dec. 12, 1963, 956,940
22 Claims. (Cl. 192—98)

This invention concerns thrust bearings of the type in which the rollers, needles or other rolling elements are kept in a cage between plane faces of two annular bearing plates arranged to be radially displaceable relatively to each other.

In French Patent No. 1,249,807 and its patent of addition No. 74,445 a thrust bearing of this type is described, supported by the control lever of a clutch mechanism by way of a fixed inner sleeve, and one of the plates of which is connected to a sheath containing lubricant and enclosing the other plate and is radially and axially displaceable relatively to said plate. The two bearing plates of this thrust bearing are relatively thick, for during a declutching operation and so as not to compromise the good operation of the roller bearing element, they require to have sufficient rigidity to withstand both the thrust transmitted by the centre part of the sleeve, and the application of this thrust in contact with the turning part of the clutch which is not always continuous, for example, when it comprises levers, diaphragm members and so forth.

The sleeve support itself comprises a shoulder of considerable diameter, necessary to ensure the support of the fixed bearing plate with the result that the opening diameter of the peripheral edge of the corresponding radial wall of the sheath must be rather large. The result of this is that, unless the thrust bearing has excessive and uneconomical dimensions, the lubricating ring formed by centrifugal effect has an insufficient radial thickness and therefore does not reach the inner level of the needles and, consequently, it is necessary to provide two flexible sealing rings to close the axial ends of the thrust bearing and thereby appreciably to increase the overall axial dimensions.

A specific object of the invention is to reduce the overall axial dimensions whilst ensuring a good seal for the same overall diametric dimensions.

According to the present invention, a thrust bearing, particularly for use in clutch mechanisms comprises needles or rollers held in a cage between plane faces of two annular bearing plates or race members displaceable radially relatively to each other, in which the rotatable race member is connected to a disc constituting a small plate adapted to bear directly on a clutch element, the stationary race of the bearing being connected to a lubricant retaining housing having an outer cylindrical wall dimensioned to permit a limited degree of radial displacement of the two race members and a pair of axially spaced radial walls extending towards the axis so as to create, over a reduced diameter, a centrifugal lubricant retaining pocket.

Due to this arrangement, according to a further feature of the invention, the thrust bearing may be supported at the end of the control lever of the clutch mechanism by an annular dish-shaped ring in which the housing is fitted, the annular dish-shaped member having the advantage of serving as a bearing surface for the race member fixed to the housing. Consequently the fixed race member may be relatively thin, and the diameter of the centre opening of the housing may be reduced so that the volume available for the lubricant is increased and the centrifugal retaining level improved. The presence of a sealing member at the housing side of the centre opening, if such seems necessary to avoid the introduction of foreign bodies, does not then increase the overall axial dimensions.

The unit comprising the rotatable race member and connected disc, in accordance with another feature of the invention, has a generally U-shaped section, forming a narrow throat within which there is radially extended the corresponding radial wall of the housing in such manner as to present an inner edge of reduced diameter which gives an efficient centrifugal retaining level of the lubricant. Moreover, this arrangement constitutes a staggered seal which makes it difficult for the lubricant to leak from the housing and the efficiency of which is completed by the fact that the rotation of the rotatable race member and connected disc unit tends to expel foreign bodies which could otherwise penetrate into the throat between the wall of the housing and the face of the disc.

This staggered seal may be completed by positive sealing means. Such means may for example, be lips formed in the radial wall which, for this purpose is preferably constructed of flexible material.

To permit use of the thrust bearing at relatively high temperature it is preferable, however, to make the radial wall inserted into the abovementioned throat of metal and to provide a sealing ring urged into contact with the movable race member by resilient diaphragm or washer means bearing against the inner face of the wall, said diaphragm being normally constructed in the form of a thin metal washer.

The sealing ring is preferably of metal, for example, cast iron, although, if necessary it may be made of a plastic material capable of resisting a high temperature, but relatively hard; polytetrafluorethylene or "neoprene" are examples of suitable plastic materials. Another advantage of the arrangement which has just been described consists in the possibility of accurately controlling the axial contact load of the sealing ring against the adjacent face of the race member, by a suitable choice of the radial dimensions of the washer, of its thickness and of the distances by which the axis of the thrust bearing is separated from the circular bearing zones of the washer on the radial wall and on the sealing ring respectively.

The invention will be described further, by way of example, with reference to the accompanying drawings, in which:

FIGS. 3 to 6 are views similar to that of FIG. 1 representing other embodiments of thrust bearing according to the invention.

Figure 1:
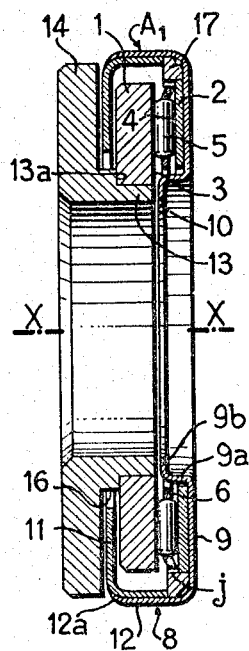
FIG. 1 is an axial section through a thrust bearing embodying the invention.

In accordance with the embodiment shown in FIG. 1 the thrust bearing of the present invention, generally designated $A_1$, comprises two annular plates 1 and 2 constituting race members and presenting bearing surfaces or races 3 and 4 for needles 5 or the like bearing elements held in a cage 6.

The unit comprising the two plates 1 and 2 and the needles 5 is enclosed in a housing 8 to which the bearing plate 2 is connected, the housing 8 and plate 2 thus constituting an annular element. The bearing plate 1 is connected to a disc or ring 14 located externally of the housing 8, the plate 1 and ring 14 thus constituting another annular element. The housing 8 comprises two radial opposed walls 9, 11 connected by a cylindrical wall 12, the radial wall 9 having an axial flange or rim 9a which cooperates with a radial extension 9b defining a centre opening 10 of small diameter to act as a lubricant seal for the housing 8, the extension 9b forming a lip approximately on a level with the plane of the bearing face 3.

This plane merges into the end face of the hub 13 of the disc 14, the bearing plate 1 being fixed on the hub 13 in contact with a shoulder 13a thereof.

The radial wall 11 of the housing 8 extends into the narrow throat 16 formed between the face of the plate 1 opposed to its bearing surface 3 and the inner face of the disc 14, the diameter at the base of the throat being as small as is compatible with rigid mounting of the plate 1 on the hub 13, so as to define a serviceable centrifugal retaining level as efficient as possible for the lubricant contained in the housing 8.

It will be observed that, in order to facilitate assembly, the housing 8 is in two pieces connected by setting at 12a. Moreover, the centring of the cage 6 on its outer diameter is ensured by a ring 17 fitted in the housing in contact with the radial wall 9 and the cylindrical wall 12.

The slight axial play formed in the throat 16 between the radial wall 11 of the housing 8 and the respective faces of the disc 14 and the bearing plate 1 permits the two bearing plates to be freely displaced relatively to each other and in particular radially due to the radial play between the periphery of the bearing plate 1 and the cylindrical wall 12 of the sheath, whilst limiting their axial displacement.

Figure 2:
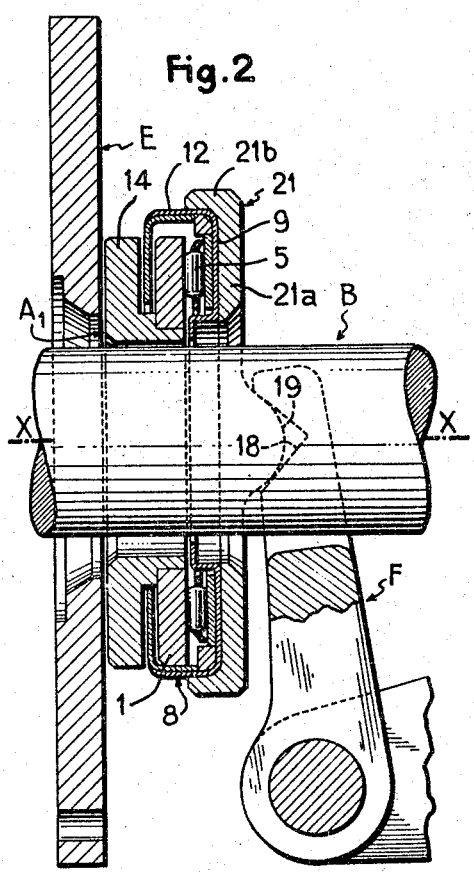
FIG. 2 is a similar view of the thrust bearing shown in FIG. 1 when mounted in a clutch mechanism.

In FIG. 2 the thrust bearing $A_1$ of FIG. 1 is mounted about a driven shaft B of a conventional clutch mechanism, only the parts being shown which co-operate with the thrust bearing of the invention.

The plate E of the mechanism, near the disc 14 of the thrust bearing, is continuously rotated. It is intended to cause, under the effect of a thrust exerted from right to left a separation of two clutch members, connected with a driving shaft and the driven shaft B respectively. This thrust is obtained by pivoting of the declutching fork F which comprises, for this purpose, notches 18 co-operating with two bosses 19 of an annular, dished thrust ring 21 in which there is fitted the housing 8 of the thrust bearing $A_1$, the rear of its radial wall 9 being supported against the bottom 21a of the ring 21, whilst its cylindrical wall 12 is enclosed by a skirt 21b of the ring. When the fork F exerts a declutching thrust, the thrust bearing unit $A_1$ is displaced to the left until the disc 14 bears against the plate E which causes rotation of the disc 14 and the bearing plate 1. The mass of the unit formed by the disc 14 and the plate 1 is sufficient, however, to produce a slight slip between the disc 14 and the plate E, which permits the plate 1, (which is illustrated as being at rest and supported by the lower portion of its periphery on the cylindrical wall 12 of the housing 8), to be approximately centred relative to the axis.

Figure 3:
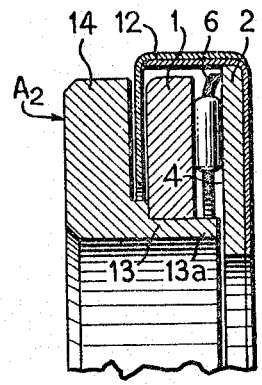

In the embodiment of thrust bearing designated $A_2$ in FIG. 3, the bearing plate 2 extends from the cylindrical wall 12 of the sheath substantially to the level of the hub 13 of the disc 14. A proper lubricant seal is assured by an axial extension or flange 13a of the hub 13 forming a lip approximately flush with the plane of the bearing face 4.

Figure 4:
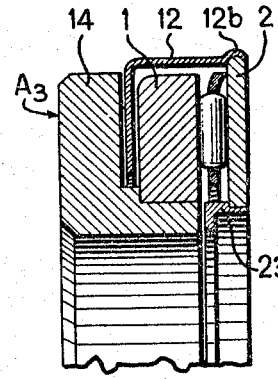

In the modification $A_3$ of FIG. 4, the plate 2 additionally replaces the radial wall 9 of the housing 8, the cylindrical wall 12 thereof being engaged at 12b on the plate 2. The axial flange or rim 9a of FIG. 1 is then replaced by a ring 23 fixed to the inner edge of the plate 2.

Figure 5:
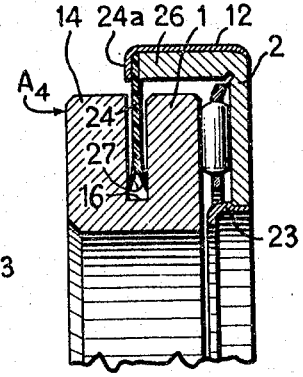

In FIG. 5, the thrust bearing $A_4$ comprises a bearing plate 1 formed in one piece with the disc 14. The radial wall 11 of the housing 8 is formed in this example by a flat ring 24 of plastic material or rubber gripped at 24a between a turned down edge of the cylindrical wall 12 and the adjacent end skirt 26 extending axially from the bearing plate 2. This flexible ring is introduced into the throat 16 by deformation. The inner edge of the ring 24 is preferably provided with two sealing lips 27 applied against the respective adjacent faces of the disc 14 and the bearing plate 1.

In the thrust bearing $A_5$ of FIG. 6, a radial wall 30 of the housing 8 extends within the throat 16 formed between the face of the plate 1 opposite the bearing face 3 and the inner face of the disc 14 and forms a separate member connected by setting at 30a to the cylindrical wall 12. The wall 30 is axially deformed in order, within the housing 8 to provide a convex bearing surface 31 of predetermined diameter for the large diameter edge of an annular resilient washer 40 which at its smaller edge is pressed against the firm rear edge 53 of a sealing ring 50 having sealing lips 51 applied against the adjacent face of the plate 1. The sealing ring 50 has a throat 52, between the lips 51 bearing against the plate 1 in order to ensure a better bearing surface and a better seal. Furthermore, it is centred by an axial flange or rim 32 of the radial wall 30 which also serves to locate the washer 40.

Naturally, the invention is not limited to the embodiments illustrated and described which have been given only by way of example. In particular, the ring 23 may be constructed of plastic material or rubber similarly to the ring 24. However, it is an advantage, in accordance with the present invention once again, in order to improve the lubricating conditions, to design the inner dimensions so that, with each pause in operation a maximum mass of lubricant, distributed in the form of a centrifugal crown in the course of this operation, is displaced towards the needles by the dropping back of the movable plate 1 towards the sheath 8.

What I claimed is:

1. A thrust bearing comprising elongated rolling elements, a cage for the rolling elements, a first bearing race member and a second bearing race member, the race members being relatively rotative and displaceable radially relative to each other and having plane faces between which the rolling elements are engaged, the first race member being integral with a ring and constituting with said ring a first annular element, means defining a lubricant retaining housing integral with the second race member and constituting with said second race member a second annular element, the second annular element having an outer cylindrical wall encompassing the first race member and dimensioned to permit a limited degree of radial displacement between the two race members, and a first radial wall and a second radial wall which are axially spaced apart and extend from the cylindrical wall towards the axis of the bearing so as to create a retaining pocket for lubricant subjected to centrifugal force in operation of the bearing, the first radial wall being cooperative with said first annular element to retain said lubricant, the second radial wall extending radially inwardly to within substantially the same radial distance from the axis of the bearing as said first annular element and being cooperative with said first annular element to retain said lubricant, and said first annular element having an extent axially of the bearing which terminates axially short of said second radial wall, whereby the radial extent and radial movement of said second radial wall are unlimited by said first annular element.

2. A thrust bearing as claimed in claim 1, comprising a dished annular ring which is adapted to engage the end of a lever controlling a clutch mechanism and supports the second race member on the side of the latter opposed to the plane face thereof.

3. A thrust bearing as claimed in claim 1, wherein said first annular element has a generally U-shaped radial section forming a narrow throat within which there extends generally the first radial wall, whereby the first radial wall has an inner periphery of small diameter defining an efficient centrifugal retaining level for the lubricant.

4. A thrust bearing as claimed in claim 3, wherein the first radial wall is constructed of resiliently deformable material.

5. A thrust bearing as claimed in claim 4, wherein the dimensions of said first race member, said ring and said first radial wall are such that the introduction of said first radial wall into the throat can be effected by deforming it to pass over one of the outer peripheries of said race member.

6. A thrust bearing as claimed in claim 4, wherein the first radial wall of deformable material has at least one inner sealing lip in contact with the corresponding face of the ring or said first race member.

7. A thrust bearing comprising elongated rolling elements, a cage for the rolling elements, a first bearing race member and a second bearing race member, the race members being relatively rotative and displaceable radially relative to each other and having plane faces between which the rolling elements are engaged, the first race member being integral with a ring and constituting a first annular element, means defining a lubricant retaining housing integral with the second race member and constituting a second annular element, the second annular element having an outer cylindrical wall encompassing the first race member and dimensioned to permit a limited degree of radial displacement between the two race members, and a first radial wall and a second radial wall which are axially spaced apart and extend from the cylindrical wall towards the axis of the bearing so as to create a retaining pocket for lubricant subjected to centrifugal force in bearing operation, the first radial wall being cooperative with said first annular element to retain said lubricant, the second radial wall extending radially inwardly to within substantially the same radial distance from the axis of the bearing as said first annular element and being cooperative with said first annular element to retain said lubricant, and said first annular element having an extent axially of the bearing which terminates axially short of said second radial wall, whereby the radial extent and radial movement of said second radial wall are unlimited by said first radial wall, said second radial wall comprising an annular axially extending flange cooperative with said first annular element for retaining said lubricant.

8. A thrust bearing as claimed in claim 1, comprising an axially extending annular flange on said first annular element and cooperative with said second radial wall for retaining said lubricant.

9. A thrust bearing as claimed in claim 7, wherein the axially extending flange is extended by a radially extending lip cooperative with said first annular element.

10. A thrust bearing as claimed in claim 9, wherein said axially extending flange is attached to said second radial wall and composed of deformable material.

11. A thrust bearing, particularly for use in a clutch mechanism, comprising elongated rolling elements, a cage for the rolling elements, a first bearing race member and a second bearing race member, the race members being relatively rotative and diplaceable radially relative to each other and having plane faces between which the rolling elements are engaged, the first race member being connected to a disc constituting a small plate, a lubricant retaining housing connected to the second race member, the housing having an outer cylindrical wall dimensioned to permit a limited degree of radial displacement of the two race members, and a pair of axially spaced radial walls extending towards the axis of the bearing so as to create, over a reduced diameter, a centrifugal lubricant retaining pocket, the first race member and disc connected thereto being of generally U-shaped radial section forming a narrow throat within which there extends radially one of the radial walls of the housing so as to present an inner edge of small diameter defining an efficient centrifugal retaining level for the lubricant, the radial wall inserted in the throat between the first race member and the disc connected thereto being of metal, a sealing ring being held in contact with said first race member by a resilient diaphragm in contact with the inner face of said radial wall.

12. A thrust bearing as claimed in claim 11, wherein the diaphragm is a washer of thin metal.

13. A thrust bearing as claimed in claim 11, wherein said radial wall is deformed axially so as to present a bearing surface for the diaphragm.

14. A thrust bearing as claimed in claim 11, wherein said sealing ring is formed on its sealing surface intended to bear against the race member with a throat which defines two sealing lips in contact with the said race member.

15. A thrust bearing as claimed in claim 11, wherein the sealing ring and the diaphragm are retained and centred relative to the bearing axes by an axial rim formed in the said radial wall.

16. A thrust bearing as claimed in claim 1, wherein the second race member constitutes said second radial wall.

17. A thrust bearing as claimed in claim 1, wherein said cage for the rolling elements is centered with a small radial play by said cylindrical wall of said second annular element.

18. A thrust bearing as claimed in claim 1, wherein the first race member and the ring integral therewith are in one piece.

19. A thrust bearing as claimed in claim 1, wherein the first race member is mounted on a hub on said ring.

20. A thrust bearing as claimed in claim 1 combined and coaxial with a clutch mechanism having a rotary declutching element, wherein said first annular element has a mass sufficient to produce a slight slip when declutching, between said ring and said declutching element permitting approximate centering of said first annular element relative to the axis of the clutch mechanism.

21. A thrust bearing as claimed in claim 1, wherein the inner dimensions of the thrust bearing are such so that each time the race members stop rotating relative to each other, a maximum mass of lubricant, distributed in the form of a centrifugal ring in the course of bearing operation, is displaced towards the elongated rolling elements by a relative radial movement between the first race member and said second annular element.

22. A clutch mechanism comprising a rotary member for actuating the clutch halves, a control or declutching fork, and a thrust bearing comprising elongated rolling elements, a cage for the rolling elements, a first bearing race member and a second bearing race member, the race members being relatively rotative and displaceable radially relative to each other and having plane faces between which the rolling elements are engaged, a disc connected to the first race member and disposed adjacent said rotary member, the bearing further comprising a lubricant retaining housing connected to the second race member, the housing having an outer cylindrical wall dimensioned to permit a limited degree of radial displacement of the two race members, and a pair of axially spaced radial walls extending towards the axis of the bearing so as to create, over a reduced diameter, a centrifugal lubricant retaining pocket, the fork being fitted with a thrust ring of annular dished configuration for receiving the bearing housing, the internal diameter of said thrust ring being at least equal to the diameter of the centre opening of the adjacent walls of the bearing housing and at the most equal to the inner diameter of the path of circulation of the bearing rolling elements.

References Cited by the Examiner
FOREIGN PATENTS 843,528   8/1960   Great Britain.

MARTIN P. SCHWADRON, *Primary Examiner.*

FRANK SUSKO, *Examiner.*

UNITED STATES PATENT OFFICE
CERTIFICATE OF CORRECTION

Patent No. 3,317,014          Dated May 2, 1967

Inventor(s) Alfred Pitner

It is certified that error appears in the above-identified patent and that said Letters Patent are hereby corrected as shown below:

In the heading, column 1, line 3, --of one-half interest-- should be inserted after "assignor".

SIGNED AND SEALED

OCT 27 1970

(SEAL)
Attest:

Edward M. Fletcher, Jr.
Attesting Officer

WILLIAM E. SCHUYLER, JR.
Commissioner of Patents